United States Patent
Haraguchi et al.

(10) Patent No.: US 7,863,343 B2
(45) Date of Patent: Jan. 4, 2011

(54) EXPANDABLE POLYLACTIC ACID RESIN PARTICLES, EXPANDED POLYLACTIC ACID RESIN BEADS AND MOLDED ARTICLE OBTAINED FROM EXPANDED POLYLACTIC ACID RESIN BEADS

(75) Inventors: Kenji Haraguchi, Yokkaichi (JP); Hajime Ohta, Yokkaichi (JP)

(73) Assignee: JSP Corporation, Tokyo (JP)

( * ) Notice: Subject to any disclaimer, the term of this patent is extended or adjusted under 35 U.S.C. 154(b) by 1241 days.

(21) Appl. No.: 11/335,663

(22) Filed: Jan. 20, 2006

(65) Prior Publication Data

US 2006/0167122 A1     Jul. 27, 2006

(30) Foreign Application Priority Data

Jan. 25, 2005     (JP)     ............... 2005-017050

(51) Int. Cl.
   *C08J 9/18*     (2006.01)
   *C08J 9/32*     (2006.01)
   *C08J 9/228*    (2006.01)

(52) U.S. Cl. .............. 521/60; 521/50; 521/76

(58) Field of Classification Search ........... 521/60, 521/50, 76
See application file for complete search history.

(56) References Cited

U.S. PATENT DOCUMENTS 4,680,353 A     7/1987 Ishihara et al. ............ 526/160
6,271,272 B1 *  8/2001 Carlier et al. ............... 521/56
2003/0236329 A1 * 12/2003 Kawamoto et al. ......... 524/136

FOREIGN PATENT DOCUMENTS

| EP | 1378538      | * | 1/2004  |
| EP | 1378538 A1   | * | 1/2004  |
| GB | 2110217      | * | 11/1982 |
| GB | 2110217      | * | 6/1983  |
| GB | 2110217 A    | * | 6/1983  |
| JP | 8-183874     |   | 7/1996  |
| JP | 2002-020525  |   | 1/2002  |

OTHER PUBLICATIONS

A. Liskova et al., "Phase-Separation Phenomena in the Polymerization of Styrene in the Presence of Polyethylene Wax", Journal of Applied Polymer Science, vol. 91, pp. 2234-2243, Wiley Periodicals, Inc., Wilmington, Delaware.

Plastic Foams, In Two Parts, Part II, Edited by Kurt C. Frisch et al., A.R. Ingram et al, Polystyrene and Related Thermoplastic Foams, 1973, pp. 550-551, New York.

* cited by examiner

*Primary Examiner*—Randy Gulakowski
*Assistant Examiner*—Kara Negrelli
(74) *Attorney, Agent, or Firm*—Bacon & Thomas, PLLC

(57) ABSTRACT

Expandable polylactic acid resin particles including (a) a base resin containing a polylactic acid resin having at least 50 mol % of lactic acid monomer component units, (b) a polyolefin wax in an amount of 0.0001 to 1 part by weight per 100 parts by weight of the base resin, and (c) a blowing agent in an amount of 1 to 30% by weight based on the weight of the resin particles. The expandable resin particles can give expanded beads having an average cell diameter of 10 to 500 μm. The expanded beads can give in-mold foam moldings.

10 Claims, 3 Drawing Sheets

EXPANDABLE POLYLACTIC ACID RESIN PARTICLES, EXPANDED POLYLACTIC ACID RESIN BEADS AND MOLDED ARTICLE OBTAINED FROM EXPANDED POLYLACTIC ACID RESIN BEADS

CROSS-REFERENCE TO RELATED APPLICATION

This application claims, under 35 USC 119, priority of Japanese Patent Application No. 2005-17050, filed Jan. 25, 2005, disclosure of which, inclusive of the specification, claims and drawings, are hereby incorporated by reference herein.

BACKGROUND OF THE INVENTION

1. Field of the Invention

This invention relates to expandable polylactic acid resin particles, to expanded polylactic acid resin beads and to a molded article obtained from the expanded polylactic acid resin beads. More specifically, the present invention is directed to a polylactic acid resin in-mold foam molding having good appearance and excellent fusion bonding between expanded beads, to expanded polylactic acid resin beads suitable for producing such a foam molding, and to expandable polylactic acid resin particles suitable for producing such expanded beads.

2. Description of Prior Art

Foamed bodies of generally employed resins such as polyethylene, polypropylene and polystyrene resins are now used in various fields because of their good heat insulating properties, cushioning properties and lightness in weight. Because of accelerated depletion of petroleum resources from which the generally employed resins are made, however, much attention is now being paid upon polylactic acid resins derived from plants such as corn. Polylactic acid resins are promising because they are decomposable, when left in the environment, into carbon dioxide and water by biological degradation. In particular, environmentally friendly foamed bodies of a polylactic acid resin such as in-mold foam moldings of expanded polylactic acid resin beads are now being developed.

For example, Japanese Unexamined Patent Publication No. JP-A-2002-20525 proposes expanded polylactic acid resin beads useful for producing in-mold foam moldings. With the expanded beads, however, steam having a temperature of 141 to 161° C. must be used to produce a molding in a mold because of high degree of crystallization of the resin. Therefore, it is necessary to use a specific molding apparatus which can withstand the high pressure steam. Further, a large amount of steam should be consumed. Additionally, part of the polylactic acid resin which has not yet been crystallized is susceptible to be thermally decomposed during the molding step, thereby to cause shrinkage and surface undulations of the resulting foam molding.

SUMMARY OF THE INVENTION

It is, therefore, an object of the present invention to provide a foam molding of expanded polylactic acid resin beads which has good fusion bonding between the beads and which has excellent appearance and mechanical strengths.

Another object of the present invention is to provide expanded polylactic acid resin beads which have fine cells and which can be easily molded to give a foam molding having strong fusion bonding between the beads.

It is a further object of the present invention to provide expandable polylactic acid resin particles which can easily give the above expanded beads.

In accomplishing the foregoing objects, there is provided in accordance with one aspect of the present invention expandable polylactic acid resin particles comprising:
a base resin comprising a polylactic acid resin having at least 50 mol % of lactic acid monomer component units,
a polyolefin wax in an amount of 0.0001 to 1 part by weight per 100 parts by weight of said base resin, and
a blowing agent in an amount of 1 to 30% by weight based on the weight of said expandable polylactic acid resin particles.

In another aspect, the present invention provides expanded polylactic acid resin beads comprising cell walls defining a plurality of cells, said cell walls comprising a base resin comprising a polylactic acid resin having at least 50 mol % of lactic acid monomer component units, and a polyolefin wax, said expanded beads having an average cell diameter of 10 to 500 μm.

In a further aspect, the present invention provides a molded article obtainable by molding the above expanded beads in a mold.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
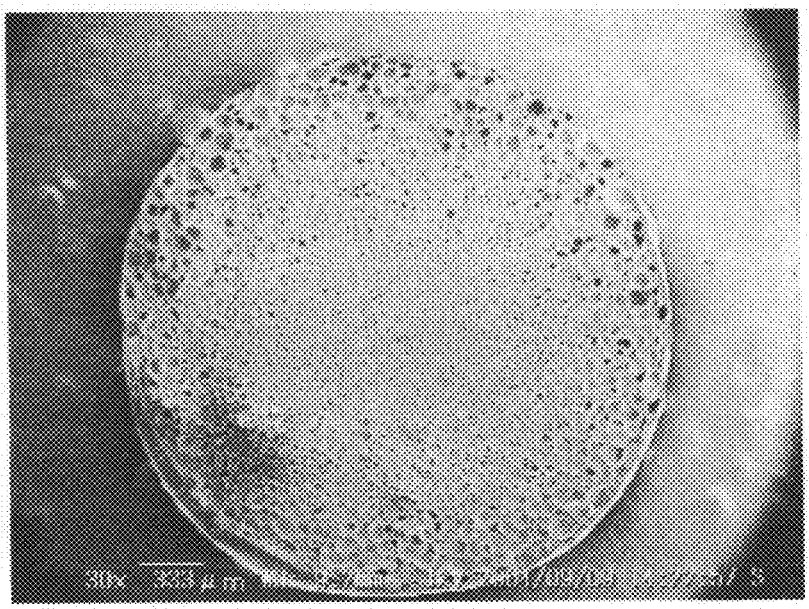
FIG. 1 is a scanning electron microscope photograph of a cross-section of an expanded polylactic acid resin bead according to the present invention obtained in Example 5 and cut into nearly equal halves.
Figure 2:
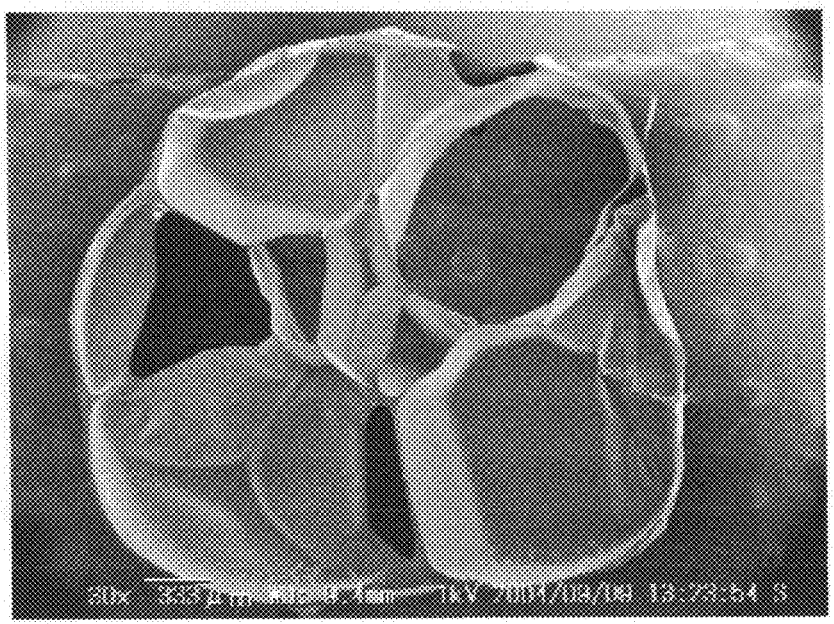
FIGS. 2 to 5 are scanning electron microscope photographs of cross-sections of expanded polylactic acid resin beads obtained in Comparative Examples 1 to 4, respectively, and each cut into nearly equal halves.
Figure 3:
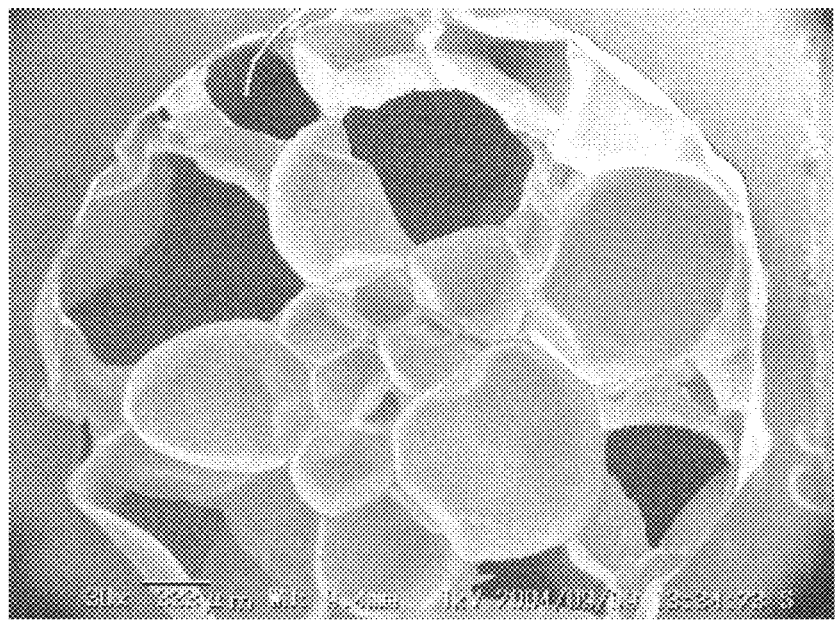
Figure 4:
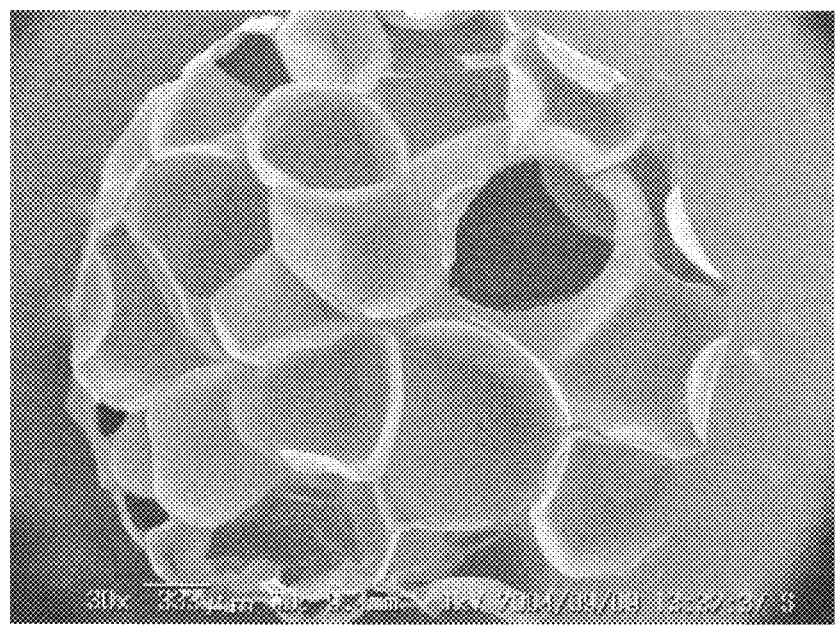
Figure 5:
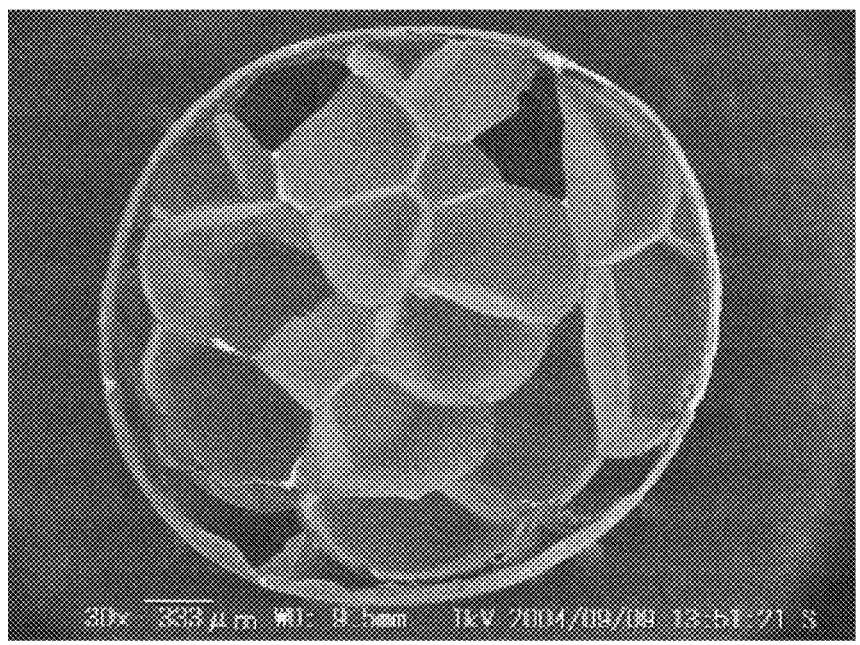

The expandable polylactic acid resin particles (hereinafter occasionally referred to as "expandable particles") according to the present invention comprise a base resin containing a polylactic acid resin. The term "polylactic acid resin" as used herein is intended to refer to a polymer or copolymer containing at least 50 mol % of lactic acid monomer component units. Examples of the polylactic acid resin include, but are not limited to, (a) a homopolymer of lactic acid, (b) a copolymer of lactic acid with one or more aliphatic hydroxycarboxylic acids other than lactic acid, (c) a copolymer of lactic acid with an aliphatic polyhydric alcohol and an aliphatic polycarboxylic acid, (d) a copolymer of lactic acid with an aliphatic polycarboxylic acid, (e) a copolymer of lactic acid with an aliphatic polyhydric alcohol, and (f) a mixture of two or more of (a)-(e) above.

Examples of the lactic acid include L-lactic acid, D-lactic acid, DL-lactic acid, a cyclic dimer thereof (i.e. L-lactide, D-lactide or DL-lactide) and mixtures thereof. Examples of the hydroxycarboxylic acid other than lactic acid of the copolymer (b) above include, but are not limited to, glycolic acid, hydroxybutyric acid, hydroxyvaleric acid, hydroxycaproic acid and hydroxyheptoic acid. Examples of the aliphatic polyhydric alcohol of the copolymer (c) or (e) above include, but are not limited to, ethylene glycol, 1,4-butanediol, 1,6- hexanediol, 1,4-cyclohexanedimethanol, neopentyl glycol, decamethylene glycol, glycerin, trimethylolpropane and pentaerythritol. Examples of the aliphatic polycarboxylic acid of the copolymer (c) or (d) above include, but are not limited to, succinic acid, adipic acid, suberic acid, sebacic acid, dodecanedicarboxylic acid, succinic anhydride, adipic anhydride, trimesic acid, propanetricarboxylic acid, pyromellitic acid and pyromellitic anhydride.

As the lactic acid, crystalline lactic acid, non-crystalline lactic acid or a mixture of crystalline and non-crystalline lactic acids may be used for the purpose of the present invention. From the standpoint of in-mold moldability of expanded polylactic acid resin beads obtained from the expandable particles, a mixture of crystalline and non-crystalline lactic acids is preferably used. The weight ratio of the crystalline lactic acid to the non-crystalline lactic acid is preferably 10:90 to 70:30, more preferably 15:85 to 60:40.

The term "crystalline polylactic acid resin" as used herein is intended to refer to a polylactic acid resin having an endothermic calorific value, as measured by heat flux scanning differential calorimetry, of more than 2 J/g. The crystalline polylactic acid resin generally has an endothermic calorific value of 20-65 J/g. The term "non-crystalline polylactic acid resin" as used herein is intended to refer to a polylactic acid resin having an endothermic calorific value, as measured by heat flux scanning differential calorimetry, of 2 J/g or less, or a polylactic acid resin which shows no endothermic peak in heat flux scanning differential calorimetry.

The term "endothermic calorific value $\Delta H_{endo:Material}$" as used herein is intended to refer to heat of fusion as determined from DSC curve of heat flux differential scanning calorimetry in accordance with JIS K7122-1987 except that the following adjustment of the test sample and measuring conditions are adopted. A polylactic acid resin sample is charged in a pan of a differential scanning calorimeter and heated to 200° C. to melt the sample. After maintaining the sample at that temperature for 10 minutes, the sample is cooled to 110° C. at a cooling rate of 2° C./minute. The sample is maintained at 110° C. for 120 minutes and then cooled to 40° C. at a cooling rate of 2° C./minute. After the above-described pretreatment, the DSC curve is measured while heating again the sample at 2° C./minute to a temperature higher by about 30° C. than the temperature at which the endothermic peak ends.

The endothermic calorific value is an integration of the endothermic peak, namely the area defined by a line passing the points "a" and "b" and the endothermic curve, in which the point "a" is a point at which the DSC curve begins separating from a base line on the low temperature-side of the endothermic peak and the point "b" is a point at which the DSC curve returns to a base line on the high temperature-side of the endothermic peak. The DSC device should be preferably operated so that each of the high and low temperature-side base lines is straight. When the base line or lines are inevitably curved, the points "a" and "b" are determined as follows. Thus, the curved base line on a base line on the low temperature-side of the endothermic peak is extended toward the high temperature side with the radius of the curvature of the base line being maintained. The point at which the DSC curve begins separating from the curved base line is the point "a". Similarly, the curved base line on a base line on the high temperature-side of the endothermic peak is extended toward the low temperature side with the radius of the curvature of the base line being maintained. The point "b" is a point where the DSC curve returns to the curved base line on the high temperature-side.

The above-described pretreatment is carried out for the purpose of crystallizing the polylactic acid resin sample as much as possible. Thus, the endothermic calorific value obtained represents a calorific value of the completely or nearly completely crystallized polylactic acid resin. Further, the above-described DSC measurement employs a heating rate of 2° C./minute. The heating rate of 2° C./minute is suitable for separating the endothermic peak and exothermic peak in the DSC curve and for obtaining accurate endothermic calorific value.

The base resin from which the expandable particles of the present invention are composed contains one or more additional resins other than the polylactic acid resin. The amount of the polylactic acid resin in the base resin is generally at least 50% by weight, preferably at least 70% by weight, more preferably at least 90% by weight, based on a total weight of the polylactic acid resin and the additional resin or resins.

Examples of the additional resin include, but are not limited to, a polyethylene resin, a polypropylene resin, a polystyrene resin and a polyester resin. The use of a biodegradable polyester resin containing at least 35 mol % of aliphatic ester component units, such as a polycondensation product of a hydroxyacid other than lactic acid, a ring open polymerization product of a lactone (e.g. polycaprolactone), a polycondensation product of an aliphatic polyhydric alcohol with an aliphatic polycarboxylic acid (e.g. polybutylene succinate, polybutylene adipate and polybutylene succinate adipate) and a polycondensation product of an aliphatic polyhydric alcohol with an aliphatic polycarboxylic acid and an aromatic polycarboxylic acid (e.g. poly(butylene adipate/terephthalate)), is preferred.

The polylactic acid resin may be prepared by any suitable known method such as a method in which lactic acid or a mixture of lactic acid and aliphatic hydroxycarboxylic acid is subjected to a dehydration polycondensation (disclosed, for example, in U.S. Pat. No. 5,310,865); a method in which a cyclic dimer of lactic acid (namely lactide) is subjected to ring-open polymerization (disclosed, for example, in U.S. Pat. No. 2,758,987); a method in which lactide and ε-caprolactone are subjected to ring-open polymerization in the presence of a catalyst (disclosed, for example, in U.S. Pat. No. 4,057,537); a method in which lactic acid and a mixture of an aliphatic dihydric alcohol and an aliphatic dibasic acid are subjected to dehydration polycondensation (disclosed, for example, in U.S. Pat. No. 5,428,126); a method in which a lactic acid polymer and a polymer of an aliphatic dihydric alcohol and an aliphatic dibasic acid are subjected to condensation in an organic solvent (disclosed, for example, in EP-A-0712880); and a method in which lactic acid is subjected to dehydration polycondensation in the presence of a catalyst, with a step of polymerization in a solid phase being involved during the course of the polycondensation. The above methods may be performed in the presence of a minor amount of an aliphatic polyhydric alcohol (e.g. glycerin), an aliphatic polybasic acid (e.g. butanetetracarboxylic acid) or polyhydric alcohol (e.g. polysaccharide) to obtain a copolymer.

For reasons of productivity, it is preferred that the polylactic acid resin contained in the base resin constituting the expandable particles (and also expanded polylactic acid resin beads and foam moldings of expanded polylactic acid resin beads) be a non-crosslinked polylactic acid resin rather than a crosslinked polylactic acid resin obtained by crosslinking treatment with, for example, a polyisocyanate or an organic peroxide.

The expandable polylactic acid resin particles additionally comprise a polyolefin wax compounded in the base resin in an amount of 0.0001 to 1 part by weight, preferably 0.001 to 0.5 part by weight, more preferably 0.03 to 0.3 part by weight, per 100 parts by weight of the base resin.

The polyolefin wax has an effect to significantly reduce the cell diameter of the expanded polylactic acid resin beads (hereinafter occasionally referred to as "expanded beads") obtainable by foaming and expanding the expandable particles. An amount of the polyolefin wax less than 0.0001 part by weight is insufficient to obtain expanded beads having desired cell diameter. Too large an amount of the polyolefin wax in excess of 1 part by weight fails to obtain any additional merits.

Examples of the polyolefin wax include, but are not limited to, polyethylene, polypropylene, a copolymer of ethylene with an α-olefin such as an ethylene-propylene copolymer and an ethylene-octene copolymer, and a copolymer of propylene with an α-olefin such as a propylene-butene copolymer and a propylene-octene copolymer. The above polyolefin waxes preferably have a number average molecular weight of 10,000 or less. For reasons of excellent effect to obtain fine cells, the use of a polyethylene wax such as polyethylene or a copolymer of ethylene with an α-olefin is particularly preferred. The above polyolefin waxes may be used singly or in combination of two or more thereof.

It is preferred that the polyolefin wax have a number average molecular weight of 500 to 6,000, more preferably 1,000 to 4,000, still more preferably 1,500 to 3,000, because the expandable particles have excellent expandability and foamability.

It is also preferred that the polyolefin wax have a molecular weight distribution index (ratio of the weight average molecular weight to the number average molecular weight) of 1.0 to 3.0, more preferably 1.0 to 2.0, particularly preferably 1.0 to 1.5, because the expandable particles have excellent expandability and foamability and have excellent effect to form desired fine cells.

The weight average molecular weight and the number average molecular weight of the polyolefin wax are as measured by gel permeation chromatography (GPC). More specifically, the GPC measurement is performed at a column temperature of 135° C. at a flow rate of o-dichlorobenzene (as a moving phase) of 1.0 ml/minute. As the detector, a differential refractometer is used. In measurement, a polyolefin wax sample is dissolved in o-dichlorobenzene at 140° C. to obtain a solution having a concentration of 0.1% by weight, and the solution is injected onto the GPC column. The elution curve obtained is calibrated by cubic polynomial fitting using the polystyrene standard to determine the weight average molecular weight (Mw) and the number average molecular weight (Mn), from which the index Mw/Mn is calculated.

It is further preferred that the polyolefin wax have a melting point of 80 to 125° C., more preferably 90 to 120° C., for reasons of expandability and foamability of the expandable particles and effect to form fine cells.

As used herein, the melting point of the polyolefin wax is as measured by heat flux differential scanning calorimetry (DSC). More specifically, a polyolefin wax (1 to 2 mg) is charged in a pan of a differential scanning calorimeter and cooled to −30° C. and maintained at that temperature for 10 minutes. The sample is then heated at rate of 10° C./minute to 160° C. to obtain a DSC curve. The peak temperature of the endothermic peak of the DSC curve represents the melting point of the polyolefin wax. When two or more endothermic peaks are present, the peak temperature of the endothermic peak having the largest endothermic calorific value represents the melting point of the polyolefin wax.

It is further preferred that the polyolefin wax have a degree of crystallization of at least 70%, more preferably at least 80%, because the expandable particles show particularly excellent expandability and foamability. The upper limit of the crystallization degree of the polyolefin wax is 100%.

As used herein, the degree of crystallization of the polyolefin wax is as measured by heat flux differential scanning calorimetry (DSC). More specifically, a polyolefin wax (1 to 2 mg) is charged in a pan of a differential scanning calorimeter and cooled to −30° C. and maintained at that temperature for 10 minutes. The sample is then heated at rate of 10° C./minute to 160° C. to obtain a DSC curve. From the DSC curve, the heat of fusion $\Delta Hm$ (J/g) is obtained as an integration of the endothermic peak, namely as the area defined by a line passing the points "a" and "b" and the endothermic curve, in which the point "a" is a point at which the DSC curve begins separating from a base line on the low temperature-side base of the endothermic peak and the point "b" is a point at which the DSC curve returns to a base line on the high temperature-side of the endothermic peak. The degree of crystallization is defined by the following formula:

Degree of crystallization (%)=$\Delta Hm/\Delta H°\times 100$ wherein $\Delta Hm$ is the heat of fusion (J/g) of the sample as described above and $\Delta H°$ is a heat of fusion (J/g) of the completely crystallized polyolefin wax. The heat of fusion $\Delta H°$ is the value described in literatures (e.g. Kobunshi Data Handbook, Kisohen (Polymer Data Handbook, Fundamental Course), Baifukan Co. (1986)). In the case of polyethylene as the polyolefin wax, $\Delta H°$ is 292 J/g. In the case of polypropylene as the polyolefin wax, $\Delta H°$ is 165 J/g.

A coloring agent of black, gray, brown, blue, green or any desired color may be incorporated into the base resin so as to color the expandable particles. The use of colored expandable particles can give colored expanded beads and colored foam moldings. The coloring agent may be any customarily employed inorganic or organic pigment or dye.

The expandable particles can contain one or more additives such as a fusion bonding improver, a flame retardant, an antistatic agent, a weatherability agent, a thickener, an inorganic filler (e.g. talc or calcium carbonate) as long as the objects and effects of the present invention can be accomplished.

The expandable particles contain a blowing agent in an amount of 1 to 30% by weight, preferably 3 to 20% by weight, based on the weight of the expandable particles. An amount of the blowing agent less than 1% by weight is insufficient to foam and expand the expandable particles with a desired expansion ratio. Too large an amount of the blowing agent in excess of 30% by weight is disadvantageous because the inflation and fusion bonding of the expanded beads, obtained from the expandable particles, at the time of molding in a mold are insufficient. The reason is probably that the use of an excess amount of blowing agent facilitates the crystallization of the polylactic acid resin during the step of producing the expanded beads.

The blowing agent may be an organic physical blowing agent or an inorganic physical blowing agent. Examples of the organic physical blowing agents include, but are not limited to, propane, isobutane, normal butane, cyclobutane, isopentane, normal pentane, cyclopentane, isohexane, normal hexane, cyclohexane, trichlorofluoromethane, dichlorodifluoromethane, chlorofluoromethane, trifluoromethane, 1,1,1,2-tetrafluoroethane, 1-chloro-1,1-difluoroethane, 1,1-difluoroethane and 1-chloro-1,2,2,2-tetrafluoroethane. Examples of inorganic physical blowing agents include nitrogen, carbon dioxide, argon and air. For reasons of low costs and freedom of environmental problem, the use of inorganic physical blowing agent, especially air, nitrogen or carbon dioxide is preferred. Above all, the use of carbon dioxide as the blowing agent is particularly preferred, since expanded beads having a small apparent density may be obtained even with a small amount of the blowing agent. The above blowing agents may be used singly or in combination of two or more thereof, for example, in combination of carbon dioxide with isobutane.

When carbon dioxide is used as the blowing agent, the content thereof in the expandable particles is preferably 2.5 to 30% by weight, more preferably 3 to 20% by weight, still more preferably 5 to 15% by weight, for reasons of obtaining expanded beads having satisfactory expansion ratio and sufficient inflatability and fusion bonding during the molding thereof in a mold.

The expandable particles may be suitably prepared as follows. Resin particles are first prepared by any known method. For example, the base resin and polyolefin wax in predetermined amounts are charged, mixed and kneaded in an extruder at a temperature sufficient to melt the base resin. The kneaded mass is then extruded through a die in the form of strands. The strands are immediately immersed in water for quenching and cut to obtain the resin particles. Alternatively, the quenching may be preceded by or simultaneous with the cutting. Alternatively, the kneaded mass is extruded in to water and the extrudate (such as strands) is cut with a cutter in the water to obtain resin particles. In an alternative, the kneaded mass is extruded in the form of a block or a plate and is cooled using a cooling press. The cooled block or plate is ground or cut to obtain the resin particles.

The average weight per particle of the resin particles is generally 0.05 to 10 mg, preferably 0.1 to 4 mg. It is not easy to prepare resin particles having excessively small weight. When the weight per particle is excessively large, there is a possibility that the resin particles are not uniformly impregnated with a blowing agent and that the density of the expanded beads obtained therefrom in a center part is higher than that in a surface part. The shape of the resin particles is not specifically limited and may be sphere, ellipsoid, solid cylinder, polygonal prism, cube or any other desired shape.

It is preferred that the base resin for the preparation of resin particles contain as low a moisture content as possible. When the base resin containing a significant amount of moisture is kneaded in an extruder, there is a possibility that degradation of the base resin is apt to occur so that the molecular weight thereof is lowered and the melt viscosity thereof is reduced. Additionally, there is a possibility that air bubbles are formed in the resin particles. Such air bubbles may adversely affect the uniformity of cells of the expanded beads obtained from such resin particles. When the base resin contains moisture, it is effective to use an extruder provided with a vent so that the moisture may be sucked out from the molten kneaded mass containing the base resin by evacuation through the vent. To prevent degradation of the base resin, the extrusion is desired to be carried out while maintaining the temperature of the base resin at 200° C. or less.

The expandable particles are produced by impregnating the resin particles with a blowing agent. The impregnation of the resin particles with a physical blowing agent may be performed by, for example, charging the blowing agent under pressure in a closed vessel, such as an autoclave, containing the resin particles so that the inside pressure in the vessel is generally within the range of 0.49 to 9.8 MPa(G). In one preferred method, resin particles are charged in a closed vessel to which a physical blowing agent such as carbon dioxide is fed under a pressure for impregnation into the resin particles under a controlled temperature to obtain expandable particles. In another preferred method, resin particles are charged in a closed vessel, such as an autoclave, together with a dispersing medium such as water. While stirring the dispersion medium at controlled temperatures, a physical blowing agent such as carbon dioxide is fed to the autoclave to impregnate the resin particles with the blowing agent and to obtain expandable particles. The latter, liquid phase impregnation method is particularly preferable because the expanded beads obtained from the expandable particles have uniform cells.

In the above impregnation methods, the impregnation temperature is preferably 5 to 60° C., more preferably 5 to 40° C., for reasons of prevention of excessive crystallization of the polylactic acid resin during the impregnation step. Excessive crystallization may prevent the expanded beads from exhibiting an increased expansion ratio and, additionally, may cause a reduction of inflatability and fusion bonding of the expanded beads and a necessity of increase of the steam pressure at the time of in-mold molding. Furthermore, there is a possibility that the foam molding obtained from the expanded beads fails to have a smooth surface. When carbon dioxide is used as the blowing agent, the impregnation temperature is preferably not higher than $(-2.5X+55)° C.$ where X is the amount (in terms of % by weight) of carbon dioxide impregnated in the expandable particles.

The impregnation temperature is a temperature of the atmosphere within the autoclave in which the resin particles are charged, when the impregnation is performed without using a dispersing medium. In the case of liquid phase impregnation method, the impregnation temperature is the temperature of the dispersing medium contained in the autoclave. The impregnation time is generally 10 minutes to 24 hours.

As used herein, the content (in terms of % by weight) of the blowing agent in the expandable particles is as measured by the following method. About 10 g of the expandable particles containing the blowing agent are sampled and the weight W1 is precisely measured. When the expandable particles have water deposits, the particles (about 20 to 30 g) are dried by blowing dry air thereto for 5 minutes before sampling. After weighing W1, the particles are placed in a dessicator. The dessicator is then evacuated to 1.5 kPa or less and allowed to stand at 23° C. until the weight of the particles is no longer reduced (generally for about 48 hours or more). Thus, the physical blowing agent is removed from the particles. The weight of the particles W2 from which the physical blowing agent has been removed is measured. The weights W1 and W2 should be measured precisely to the fourth decimal place (0.0001 g). The content (in terms of % by weight) of the blowing agent is calculated from the following formula:

Content of blowing agent (% by weight)=$(W1-W2)/W1 \times 100$ wherein W1 represents the weight (g) of the expandable particles containing the blowing agent and W2 is the weight (g) of the expandable particles from which the blowing agent has been removed.

The resin particles and the expandable particles thus obtained are suitably stored in low temperature and low humidity environment so as to prevent the hydrolysis of the base resin. The expandable particles generally have a particle size of about 0.1 to 7 mm, preferably about 0.2 to 5 mm, still more preferably about 0.4 to 3 mm.

The expanded beads according to the present invention comprise a base resin containing a polylactic acid resin having at least 50 mol % of lactic acid monomer component units, and a polyolefin wax. As the polylactic acid resin, base resin and polyethylene wax, there may be used those which are described above in connection with the expandable particles.

The expanded beads have a multiplicity of cells having an average cell diameter (ADT) of 10 to 500 μm, preferably 20 to 300 μm, more preferably 20 to 200 μm. When the average cell diameter ADT is greater than 500 μm, the mechanical properties of foam moldings obtained from the expanded beads are reduced. Additionally, the cell walls of the expanded beads are apt to be broken during the molding in a mold and, therefore, a shrinkage of the foam molding is apt to be caused. An average diameter less than 10 μm is disadvantageous because the foam molding obtained from the expanded beads has surface undulations and poor appearance due to fusion of the surface thereof during the heating with steam in a mold. The average cell diameter ADT of the expanded beads may be controlled by the amount of the polyolefin wax contained therein, namely by the amount of the polyolefin wax contained the expandable particles from which the expanded beads are prepared.

As used herein, the average cell diameter ADT of the expanded beads is as measured by the following method. An expanded bead is cut into nearly equal halves and the cross-section is photographed using a scanning electron microscope. On the photograph, a straight line passing the center of the cross-section is drawn. The length (Lt) of the straight line on the cross-section is measured and the number (Ct) of the cells located on the straight line is counted. In this case, any cell, at least a part of which is located on the straight line, is included in the counts. The cell diameter (Dt) is calculated by dividing the length Lt by the number Ct (Dt=Lt/Ct)). Similar procedures are carried out for n-number (n is 10 or more) of arbitrary expanded beads. The average cell diameter ADT is an arithmetic mean of the cell diameters (Dt) of the n-number of the beads.

The amount of the polyolefin wax contained in the expanded beads is preferably 0.0001 to 1 part by weight, more preferably 0.001 to 0.5 part by weight, still more preferably 0.03 to 0.3 part by weight, per 100 parts by weight of the base resin, because of excellent secondary expansion property (inflatability) and fusion bonding efficiency of the expanded beads at a time of the molding thereof in a mold. Since the polyolefin wax hardly decomposes during the preparation of the expanded beads, the amount of the polyolefin wax in the expanded beads depends upon the amount thereof in the expandable particles from which the expanded beads are prepared.

It is preferred that the expanded beads have a surface region having an average cell diameter (ADS) greater than the average cell diameter ADT of the expanded beads. The term "surface region" as used herein is intended to refer to an annular surface region having a thickness of 300 μm from the surface of the beads. The other region of the beads is termed "inside region". Namely, an expanded bead consists of a surface region having a thickness of 300 μm and an inside region surrounded by the surface region. Thus, the fact that the average cell diameter ADS of the surface region is greater than the average cell diameter ADT of expanded beads means that the average cell diameter ADS of the surface region is greater than the average cell diameter of the inside region of the expanded beads.

As used herein, the average cell diameter ADS of the surface region of the expanded beads is as measured by the following method. An expanded bead is cut into nearly equal halves and the cross-section is photographed using a scanning electron microscope. On the photograph, a straight line passing the center of the cross-section is drawn. The number (Cs) of the cells which are located on the straight line and which are entirely located within the surface region is counted. Thus, a cell, only a part of which is located within the surface region, is excluded from the counts, even when the cell is located on the straight line. Then, a total length Ls of those portions of the straight line which are located on the counted cells is measured. The cell diameter (Ds) is calculated by dividing the length Ls by the number Cs (Ds=Ls/Cs)). Similar procedures are carried out for n-number (n is 10 or more) of arbitrary expanded beads. The average cell diameter ADS of the surface region is an arithmetic mean of the cell diameters (Ds) of the n-number of the beads. When the counted number Cs is zero, the length of that portion of the straight line which is located on the outsidemost cell (the cell nearest to the surface of the bead) is employed as the cell diameter Ds.

The expanded beads, whose surface region has an average cell diameter ADS greater than the average cell diameter ADT thereof, show excellent moldability and give foam moldings having excellent mechanical strengths. The moldability of the expanded beads is greatly influenced by the average cell diameter of the surface region thereof. A larger average cell diameter ADS of the surface region is preferable from the standpoint of the moldability of the expanded beads, provided that the average cell diameter ADT of the beads is within the specified range of 10 to 500 μm. Thus, the average cell diameter ADS of the surface region is preferably 30 to 800 μm, more preferably 50 to 500 μm, particularly preferably 60 to 300 μm. On the other hand, the mechanical strengths such as compressive strength of a foam molding obtained from the expanded beads are greatly influenced by the average cell diameter of the inside region of the beads, the uniformity of the cells and the closed cell content. From the standpoint of the improvement of the mechanical strengths, a smaller average cell diameter of the inside region of the beads is preferable, provided that the average cell diameter ADT of the beads is within the specified range of 10 to 500 μm. Thus, the average cell diameter of the inside region is preferably 10 to 400 μm, more preferably 20 to 200 μm, particularly preferably 30 to 150 μm.

It is preferred that the bulk density of the expanded beads be 10 to 300 kg/m$^3$, more preferably 12 to 200 kg/m$^3$, still more preferably 15 to 100 kg/m$^3$, for reasons of uniformity of the apparent density of the beads, good inflatability and fusion bonding of the beads at the time of molding in a mold, good physical properties of a foam molding obtained from the beads and low shrinkage of the foam molding.

As used herein, the bulk density of the expanded beads is as measured by the following method. Expanded beads are filled in a one liter measuring cylinder to the graduation of 1 L. The weight WP (g) of the expanded beads having a volume of 1 L is then measured to the first decimal place (0.1 g). The bulk density ($D_{bulk}$ kg/m$^3$) of the expanded beads is calculated according to the following formula:

$$D_{bulk}(kg/m^3) = \{WP(g) \times 0.001\ (kg/g)\}/\{1\ (L) \times 0.001\ (m^3 1\ L)\}$$

The apparent density of the expanded beads is measured as follows. In a measuring cylinder containing water, a quantity (weight Wb (g)) of the expanded beads are immersed to measure the volume Vb (cm$^3$) of the beads from the rise of the water level. The apparent density $D_{app}$ is calculated by the formula:

$$D_{app}(kg/m^3) = \{Wb(g) \times 0.001\ (kg/g)\}/\{Vb \times 0.000001\ (m^3/cm^3)\}$$

The expanded beads may be obtained by heating the expandable particles containing a blowing agent such as carbon dioxide to allow the expandable particles to soften, foam and expand. A suitable heating medium such as steam, air or nitrogen having a controlled temperature may be used to heat the expandable particles. A steam-air mixed gas is preferably used. The expansion may be carried out in any suitable known method. In one preferred method, the expandable particles are placed in a closed vessel equipped with a stirrer, to which a heating medium is then fed for expansion of the expandable resin particles.

The temperature of the atmosphere for heating the expandable particles, i.e. expansion temperature, is generally between (Tg−30° C.) and (Tg+60° C.), preferably between (Tg−10° C.) and (Tg+40° C.), where Tg is a glass transition temperature of the polylactic acid resin from which the expandable particles are formed. With the above expansion temperature, the expanded beads obtained have a suitable expansion ratio, a suitable closed cell content and a suitable moldability.

The glass transition temperature as used herein is a midpoint glass transition temperature as measured in accordance with JIS K7121-1987 and is calculated from the midpoint of a heat flux of a DSC curve obtained by heat flux differential scanning calorimetry at a heating rate of 10° C./minute. The glass transition temperature is measured after the sample has been heat treated under specified conditions as described in JIS K7121-1987, Paragraph 3, Control of conditions of sample (3).

The expanded beads according to the present invention preferably have a particle diameter of generally about 0.3 to 20 mm, preferably about 0.6 to 12 mm, more preferably about 1 to 8 mm, and an open cell content of preferably 30% or less, more preferably 20% or less, particularly preferably 10% or less. The open cell content is as measured according to ASTM D2856-70, Procedure C. As used herein, the closed cell content and the closed cell content have the relationship that the closed cell content (%) plus the open cell content (%) equals 100%. The thus obtained expanded beads are desirably stored under conditions so that hydrolysis of the resin is prevented. Thus, high temperature and high humidity environment should be preferably avoided.

It is preferred that the expandable particles and the expanded beads contain a plasticizer for reasons of improving expandability of resin particles, improving the secondary expandability and fusion bonding of the expanded beads, and lowering the molding temperature. The term plasticizer as used herein is intended to refer to a class of substances that can lower the glass transition temperature of the polylactic acid resin when contained in the expandable particles (or the expanded beads). The plasticizer is desired to be able to reduce the glass transition temperature by 0.5 to 20° C., more preferably by 1 to 15° C., though the temperature reduction depends upon the kind and amount of the plasticizer.

A plasticizer generally used for thermoplastic resins may be suitably used for the purpose of the present invention. Examples of the plasticizer include, but are not limited to, glycerin derivatives, ether ester derivatives, glycolic acid derivatives, glycol ester derivatives, citric acid derivatives, adipic acid derivatives, rosin derivatives, and tetrahydrofurfuryl alcohol derivatives. These plasticizers may be used singly or in combination of two or more thereof.

The glycerin derivatives may be, for example, glycerin fatty acid esters. Glycerin fatty acid esters comprising at least 75% by mass of diacetylmonoacyl glycerol containing a saturated fatty acid moiety having 8 to 16 carbon atoms are suitably used. Monoglycerides of unsaturated fatty acids, diglycerides of saturated fatty acids and triglycerides of fatty acids, which have poor compatibility with polylactic acid resins, are not fully satisfactory. Suitable glycerin fatty acid esters contain at least 75% by mass of a monoglyceride of a fatty acid and/or its acetylated product, in which the fatty acid is selected from caprylic acid ($C_8$), capric acid ($C_{10}$), lauric acid ($C_{12}$), myristic acid ($C_{14}$) and palmitic acid ($C_{16}$). An acetylated product of a monoglyceride of a $C_8$-$C_{12}$ saturated fatty acid, such as glycerin diaceto-monocaprylate, glycerin diaceto-monocaprate or glycerin diaceto-monolaurate and their analogues, has good compatibility with a polylactic acid resin and is particularly preferred. Also preferably used are glycerin triacetate, glycerin tributyrate, glycerin tripropionate and their analogues. Above all, glycerin diaceto-monocaprylate (commercially available under a trade name of RIKEMAL PL-019 from Riken Vitamin Co., Ltd.) is particularly suitably used for the purpose of the present invention.

The ether ester derivatives may be, for example, compounds represented by the following formula:

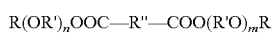

R(OR')$_n$OOC—R"—COO(R'O)$_m$R wherein R represents an alkyl group, R' represents an alkylene group, R" represents a divalent organic group containing an alkylene group, and m and n are each independently an integer of 1 to 500. Examples the alkyl group include those having 1 to 20 carbon atoms, such as methyl, ethyl, propyl, isopropyl, butyl, secondary butyl, tertiary butyl, isobutyl, amyl, hexyl, heptyl, octyl, isooctyl, 2-ethylhexyl, nonyl, decyl, isodecyl, dodecyl, tetradecyl, hexadecyl and octadecyl. Examples of the alkylene group include those having 2 to 8 carbon atoms, such as 1,2-propylene, 1,2-butylene and 1,4-butylene.

The glycolic acid derivatives may be, for example, ethylphthalyl ethyl glycolate, butylphthalyl butyl glycolate or its analogues. The glycol ester derivatives may be, for example, triethylene glycol diacetate or its analogues.

The citric acid derivatives may be, for example, tributyl acetylcitrate or its analogues.

The adipic acid derivatives may be, for example, dimethyl adipate, diethyl adipate, dibutyl adipate, dioctyl adipate and their analogues.

The rosin derivatives may be, for example, compounds represented by the following formula:

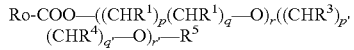

Ro-COO—((CHR$^1$)$_p$(CHR$^1$)$_q$—O)$_r$((CHR$^3$)$_p'$(CHR$^4$)$_q'$—O)$_{r'}$—R$^5$ wherein Ro represents a rosin residue, R$^1$, R$^2$, R$^3$ and R$^4$ each independently represent a hydrogen atom or methyl, R$^5$ represents a hydrogen atom, an alkyl group having 1 to 8 carbon atoms or an acyl group, p, p', q and q' are each an integer of 0 to 6 with the proviso that (p+q) is 1 to 6 and (p'+q') is 1 to 6, and r and r' are each an integer of 0 to 7 with the proviso that (r+r') is 1 to 7.

Examples of the compound of the above formula include diethylene glycol ester of rosin, diethylene glycol acetate ester of rosin, triethylene glycol ester of rosin, tetraethylene glycol ester of rosin, triethylene glycol monomethyl ether ester of rosin and triethylene glycol monoethyl ether ester of rosin.

The tetrahydrofurfuryl alcohol derivatives may be, for example, compounds represented by the following formula:

Th—OOC—R wherein Th represents a tetrahydrofurfuryl alcohol residue and R represents an alkyl group, an alkenyl group, an aryl group, an aryl group having at least one hydroxyl group, a rosin residue, a group represented by —COOTh or a group represented by —X—(COOY)$_n$ where X represents an aryl group, an aryl group having at least one hydroxyl group, a cycloalkyl group, a cycloalkenyl group, an alkylene group which may contain at least one acylated hydroxyl group or an alkenylene group which may contain at least one acylated hydroxyl group, Y represents an alkyl group or a tetrahydrofurfuryl alcohol residue and n is an integer of 1 to 4.

Examples of the compound of the above formula include ditetrahydrofurfuryl succinate, ditetrahydrofurfuryl adipate, ditetrahydrofurfuryl sebacate, dodecane-2 acid ester of ditetrahydrofurfuryl alcohol and ditetrahydrofurfuryl phthalate.

The plasticizer may be suitably incorporated into the expandable particles during the following steps (1) to (4):

(1) A step, in the process of preparing resin particles, in which a polylactic acid resin and optionally a desired additive are melted and kneaded;

(2) A step in which resin particles are impregnated with a blowing agent;

(3) A step in which expandable particles containing a blowing agent are expanded; and (4) A step, in the process of preparing resin particles, in which a polylactic acid resin, a blowing agent and, optionally, an additive are melted and kneaded in an extruder.

Thus, step (1) may be performed, for example, by melting and kneading the polylactic acid resin and the plasticizer. The kneaded mass is then formed into resin particles. Step (2) may be performed, for example, by incorporating the plasticizer into at least a surface region of the resin particles during, before or after impregnating the resin particles with the blowing agent.

Step (3) may be performed, for example, by the following two different methods (3-a) and (3-b). In method (3-a), the expandable particles are expanded with an expanding device by heating with a heating medium. In this case, the plasticizer is sprayed over surfaces of the expandable particles. Simultaneously with or after the spraying, the expandable particles are heated with the heating medium for expansion in the expanding device. Alternatively, the heating medium to which the plasticizer has been added is fed to the expanding device containing the expandable particles while spraying a plasticizer over the expandable particles. In method (3-b), in an autoclave, resin particles dispersed in an aqueous dispersing medium are impregnated with a blowing agent. The resin particles impregnated with the blowing agent are discharged together with the dispersing medium from the autoclave into a lower pressure zone to obtain expanded beads. In this case, the plasticizer is added to the dispersing medium so that at least a surface region of the resin particles in the autoclave contains the plasticizer. Step (4) may be performed, for example, by melting and kneading a polylactic acid resin composition containing the polylactic acid resin, the blowing agent and the plasticizer is kneaded in an extruder. The kneaded composition is then formed into expandable particles.

Among the above methods, method (3-b) is particularly preferably used. In a preferred embodiment, the method (3-b) is performed by dispersing the resin particles together with the plasticizer in an aqueous dispersing medium in the presence of a blowing agent. The dispersion is stirred while controlling the temperature thereof so that the blowing agent and the plasticizer are impregnated in the resin particles. With this method, the plasticizer can be uniformly impregnated in at least a surface region of the expanded beads obtained. Further, the expanded beads have uniform cell shape. When method (3-b) is adopted, it is preferred that the plasticizer be in the form of a liquid during the step of impregnating the resin particles with the blowing agent, since the plasticizer can be easily dispersed in the dispersing medium.

The amount of the plasticizer is preferably 0.2 to 3 parts by weight, more preferably 0.3 to 2.5 parts by weight, still more preferably 0.4 to 2 parts by weight, per 100 parts by weight of the expandable particles (or expanded beads), though the amount varies with the kind of the plasticizer and the pressure of steam used in the molding step, for reasons of obtaining significant effects of the addition of the plasticizer while preventing a reduction of the compressive strength at an elevated temperature and avoiding deposition of dusts due to sticking property.

The foam molding of the present invention may be obtained by molding the expanded beads in a mold. The foam molding has excellent bonding between expanded beads, excellent mechanical strengths such as flexural strength and compressive strength, excellent dimensional stability and excellent surface smoothness.

The foamed molding according to the present invention may have any desired shape and may be in the form of, for example, a vessel, a container, a plate, a cylinder, a solid cylinder or rod, a sheet or a block.

The apparent density of the foamed molding is preferably 15 to 300 kg/m$^3$, more preferably 15 to 200 kg/m$^3$, for reasons of satisfactory mechanical strength, heat insulating property and lightness in weight. The apparent density (DA kg/m$^3$) may be calculated from the formula shown below by dividing the weight WM (g) of the foamed molding by the volume VM (cm$^3$) thereof as determined from the outer dimensions thereof.

$$DA(kg/m^3) = \{WM(g) \times 0.001 \ (kg/g)\} / \{VM(L) \times 0.001 \ (m^3/L)\}$$

The foam molding preferably has a ratio of its flexural strength (in terms of MPa) to its apparent density (in terms of kg/m$^3$) of at least 7 kN·m/kg, more preferably at least 9 kN·m/kg, still more preferably at least 10 kN·m/kg, for reasons of strong fusion bonding between the expanded beads and of excellent mechanical strengths. The upper limit of the flexural strength to apparent density ratio of the foamed molding is generally about 30 kN·m/kg.

The flexural strength as used herein is intended to be the maximum bending strength measured in accordance with JIS K7221-2:1999, appendix 1. A sample molding having a length of 300 mm, a width of 75 mm and a thickness of 25 mm is prepared such that one of the two opposing surfaces having a length of 300 mm and a width of 75 mm is a cut surface obtained by cutting the molding, while the other surface being as molded surface (skin of the molding). With the as-molded surface of the sample facing downward, the sample is subjected to the bending test.

The foamed molding is preferably prepared by heating the expanded beads filled in a mold with a suitable heating medium, such as steam or hot air, having a temperature sufficient to fuse the surfaces of the expanded beads. The temperature of the heating medium is preferably 80 to 130° C., more preferably 90 to 120° C. As a result of the above heating, the expanded beads are fuse-bonded together to form an integral foam molding. As the mold, there may be used a customarily employed metal mold or a continuous molding machine having a running steel belt as disclosed in JP-A-2000-15708 or U.S. Pat. No. 5,968,430.

It is preferred that the expanded beads be treated before molding to increase the pressure inside of the cells thereof. Such a pretreatment may be carried out by allowing the beads to stand for a suitable period of time in a closed vessel to which a pressurized gas has been fed. The gas may be an inorganic gas such as nitrogen, air or carbon dioxide, or an organic gas such as butane. By increasing the inside pressure of the expanded beads, the foaming efficiency and adhesion strength of the expanded beads may be improved and shape recovery of the foamed molding obtained may be improved.

The inside pressure of the beads is preferably adjusted to a range of 0.03 to 0.3 MPa, more preferably 0.05 to 0.2 MPa.

The inside pressure of the expanded beads is determined just before the molding as follows. About 1 L of the expanded beads whose inside pressure has been increased are transferred to a room maintained at 23° C. and 50% relative humidity under ambient pressure. The weight W1 (g) of the beads is measured with a weighing device in the room. The expanded beads are then allowed to stand for 48 hours in the room. Then, the weight W2 (g) of the expanded beads is measured after the lapse of the 48 hours period. The measurement of the weights W1 and W2 should be carried out to the second decimal place (0.01 g). The inside pressure P (MPa) of the expanded beads is calculated from the formula below:

$$P(\text{MPa}) = \{(W1-W2) \times 0.001\}/(MW \times 0.001) \times R \times 296/\{(W2 \times 0.001) \times (1/D) \times 0.6\} \times 0.000001$$

wherein W1 is the weight (g) of the expanded beads having increased inside pressure, W2 is the weight (g) of the expanded beads after 48 hours, MW is the molecular weight (g/mol) of the gas used for increasing the inside pressure of the beads, D is the bulk density (kg/m$^3$) of the expanded beads and R is the gas constant (8.31 J/K·mol).

The following examples will further illustrate the present invention. Parts are by weight.

Example 1

A blend of 20 parts of crystalline polylactic acid resin (LACEA H-100 manufactured by Mitsui Chemicals, Inc.), 80 parts of non-crystalline polylactic acid resin (LACEA H-280 manufactured by Mitsui Chemicals, Inc.) and 0.01 part of polyethylene wax P-1 (Trade name: POLYWAX 1000 manufactured by Toyo Petrolite Co., Ltd., number average molecular weight: 2,200, molecular weight distribution index: 1.2, melting point: 110° C., degree of crystallization: 89%) was melted and kneaded in an extruder. The kneaded mixture was then extruded in the form of strands. The strands were immediately quenched in water at about 25° C. and cut to obtain solid cylindrical resin particles having a diameter of about 1.2 mm, a length of about 1.4 mm and an average weight per one particle of about 2 mg.

In a 3 L autoclave equipped with a stirrer, 600 g of the thus obtained resin particles, 900 g of deionized water, 0.9 g of tribasic calcium phosphate and 0.02 g of sodium dodecyl sulfate were charged. While maintaining the contents in the autoclave at 30° C., carbon dioxide (CO$_2$) was charged under pressure into the autoclave so that the inside pressure of the autoclave was 3 MPa(G). The autoclave was maintained as such for 10 minutes and the feed of carbon dioxide was stopped. Then, the autoclave was left as such for 3 hours. As a result, the pressure in the autoclave decreased to 2.5 MPa (G). The pressure in the autoclave was then released to the atmospheric pressure and expandable resin particles impregnated with carbon dioxide as a blowing agent were collected.

The expandable resin particles were washed with water, dehydrated by centrifuge and then immediately charged in a closed vessel equipped with a stirrer and preheated to about 80° C. with a mixture of steam with air. The particles were heated for about 1 to 2 minutes until the expansion and foaming thereof were completed. The thus obtained expanded beads were collected from the vessel.

The collected expanded beads were air-dried at room temperature for about 24 hours and then charged in an autoclave. The autoclave was gradually pressurized with air at a rate of 0.1 MPa/hour. After the pressure within the autoclave had arrived at 0.5 MPa(G), the pressure was reduced to 0.2 MPa (G). The autoclave was then maintained as such for 3 hours.

The thus treated expanded beads were collected and immediately molded using an EPS molding machine (Model VS500 manufactured by Daisen Industry Co., Ltd.) having a mold with dimensions of 300 mm length, 75 mm width and 25 mm height. Thus, the beads filled in the mold (cracking: 10 mm) were heated for 15 seconds with steam at 0.02 MPa(G) from one side (the side with a dimension of 300×75 mm) of the mold and for another 15 seconds with steam at 0.02 MPa(G) from the opposite side thereof. The mold was then cooled for 90 seconds with water and further allowed to cool for 120 seconds under vacuum. The foam molding thus obtained was thereafter taken out of the mold.

The foam molding was dried at 40° C. for 12 hours and thereafter measured for various properties. The number average molecular weight, melting point, degree of crystallization and molecular weight distribution index of the polyethylene wax P-1 are summarized in Table 1. The carbon dioxide content of the expandable particles; the bulk density and inside pressure of the expanded beads; and the apparent density, appearance, flexural strength and the ratio of the flexural strength to the apparent density of the foam molding are summarized in Table 2. The number average molecular weight and weight average molecular weight of the polyolefin waxes in Examples were measured using a GPC device (Tradename: GPCV2000 manufactured by Japan Waters Inc.) provided with columns (manufactured by Polymer Laboratories, PLgel 120 μm, MIXED-A, 30 cm×4) at a column temperature of 135° C. with an injection amount of 0.5 ml.

Examples 2 to 5

Foam moldings were prepared in the same manner as that in Example 1, except that the amount of polyolefin wax P-1 was changed as shown in Table 2. The properties of the expandable resin particles, expanded beads and foam moldings are shown in Table 2. The SEM photograph of a cross-section of the bead obtained in Example 5 is shown in FIG. 1.

Examples 6 to 12

Foam moldings were prepared in the same manner as that in Example 4, except that polyolefin wax P-1 was substituted with each of polyolefin waxes P-2 to P-8 as shown in Table 3 and Table 4. The properties of polyolefin waxes P-2 to P-8 are shown in Table 1. The properties of the expandable resin particles, expanded beads and foam moldings are shown in Table 3 and Table 4.

Examples 13 and 14

Foam moldings were prepared in the same manner as that in Example 1, except that the proportion of the crystalline and non-crystalline polylactic acid resins was changed as shown in Table 4, and that the amount of polyolefin wax P-1 was changed as shown in Table 4 (in the case of Example 14). The properties of the expandable resin particles, expanded beads and foam moldings are shown in Table 4.

Comparative Example 1

A foam molding was prepared in the same manner as that in Example 1, except that polyolefin wax P-1 as a nucleating agent (cell diameter controlling agent) was not used at all as shown in Table 5.

Comparative Example 2

A foam molding was prepared in the same manner as that in Example 1, except that 0.1 part of talc (Trade name: SIMGON manufactured by Nippon Talc Co., Ltd.) was used in place of polyolefin wax P-1 as the nucleating agent as shown in Table 5.

Comparative Example 3

A foam molding was prepared in the same manner as that in Example 1, except that 0.1 part of calcium stearate was used in place of polyolefin wax P-1 as the nucleating agent as shown in Table 5.

Comparative Example 4

A foam molding was prepared in the same manner as that in Example 1, except that 0.1 part of ethylenebisamide (Trade name: KAO WAX EB-FF manufactured by Kao Corporation) was used in place of polyolefin wax P-1 as the nucleating agent as shown in Table 5. The properties of the expandable resin particles, expanded beads and foam moldings obtained in Comparative Examples 1 to 4 are shown in Table 5. The SEM photographs of a cross-section of each of the beads obtained in Comparative Examples 1 to 4 are shown in FIGS. 2 to 5, respectively.

TABLE 1

| Wax | Weight average molecular weight | Number average molecular weight | Molecular weight distribution index | Melting point (°C.) | Degree of crystallization (%) | Trade name (manufacturer) |
|---|---|---|---|---|---|---|
| Polyethylene wax P-1 | 2,700 | 2,200 | 1.2 | 110 | 89 | POLYWAX 1000 (Toyo Petrolite Co., Ltd.) |
| Polyethylene wax P-2 | 1,200 | 950 | 1.2 | 79 | 86 | POLYWAX 500 (Toyo Petrolite Co., Ltd.) |
| Polyethylene wax P-3 | 2,000 | 1,700 | 1.2 | 101 | 85 | POLYWAX 850 (Toyo Petrolite Co., Ltd.) |
| Polyethylene wax P-4 | 2,700 | 1,300 | 2.0 | 112 | 91 | HIWAX 100P (Mitsui Chemicals, Inc.) |
| Polyethylene wax P-5 | 11,500 | 2,700 | 4.3 | 98 | 56 | SANWAX 171P (Sanyo Chemical Industries, Ltd.) |
| Polyethylene wax P-6 | 5,400 | 4,500 | 1.2 | 123 | 84 | POLYWAX 2000 (Toyo Petrolite Co., Ltd.) |
| Polyethylene wax P-7 | 7,600 | 6,000 | 1.3 | 127 | 84 | POLYWAX 3000 (Toyo Petrolite Co., Ltd.) |
| Polyethylene wax P-8 | 13,300 | 4,300 | 3.1 | 107 | 52 | A-C 3A (Honeywell International Inc.) |

TABLE 2

| | | Example 1 | Example 2 | Example 3 | Example 4 | Example 5 |
|---|---|---|---|---|---|---|
| Polylactic acid resin composition (part) | Crystalline LACEA H-100 | 20 | 20 | 20 | 20 | 20 |
| | Non-Crystalline LACEA H-280 | 80 | 80 | 80 | 80 | 80 |
| Polyolefin wax | Kind | P-1 | P-1 | P-1 | P-1 | P-1 |
| | Amount (part) | 0.01 | 0.0003 | 0.003 | 0.03 | 0.1 |
| Content of blowing agent of expandable particles (% by weight) | | 5.8 | 5.9 | 6.3 | 6.1 | 5.5 |
| Bulk density of expanded beads (kg/m³) | | 48 | 41 | 50 | 50 | 53 |
| Average cell diameter of expanded beads (μm) | | 70 | 260 | 110 | 60 | 60 |
| Average cell diameter of surface region of expanded beads (μm) | | 120 | 400 | 200 | 100 | 110 |
| Inside pressure of expanded beads (MPa) | | 0.12 | 0.12 | 0.14 | 0.12 | 0.20 |
| Appearance of foam molding | | A | B | B | A | A |
| Apparent density of foam molding (kg/m³) | | 68 | 53 | 69 | 71 | 76 |
| Flexural strength of foam molding (MPa) | | 0.85 | 0.52 | 0.97 | 0.87 | 0.69 |
| Flexural strength/apparent density ratio (kN·m/kg) | | 12.5 | 9.8 | 14.1 | 12.2 | 9.1 |

TABLE 3

| | | Example 6 | Example 7 | Example 8 | Example 9 | Example 10 |
|---|---|---|---|---|---|---|
| Polylactic acid resin composition (part) | Crystalline LACEA H-100 | 20 | 20 | 20 | 20 | 20 |
| | Non-Crystalline LACEA H-280 | 80 | 80 | 80 | 80 | 80 |
| Polyolefin wax | Kind | P-2 | P-3 | P-4 | P-5 | P-6 |
| | Amount (part) | 0.03 | 0.03 | 0.03 | 0.03 | 0.03 |

TABLE 3-continued

|  | Example 6 | Example 7 | Example 8 | Example 9 | Example 10 |
|---|---|---|---|---|---|
| Content of blowing agent of expandable particles (% by weight) | 4.9 | 5.5 | 5.4 | 5.6 | 6.2 |
| Bulk density of expanded beads (kg/m$^3$) | 89 | 50 | 66 | 40 | 44 |
| Average cell diameter of expanded beads (μm) | 160 | 70 | 100 | 190 | 180 |
| Average cell diameter of surface region of expanded beads (μm) | 210 | 150 | 170 | 390 | 400 |
| Inside pressure of expanded beads (MPa) | 0.11 | 0.17 | 0.16 | 0.15 | 0.13 |
| Appearance of foam molding | B | A | A | B | B |
| Apparent density of foam molding (kg/m$^3$) | 122 | 66 | 96 | 53 | 61 |
| Flexural strength of foam molding (MPa) | 1.26 | 0.75 | 1.84 | 0.59 | 0.75 |
| Flexural strength/apparent density ratio (kN · m/kg) | 10.3 | 11.3 | 19.2 | 11.2 | 12.4 |

TABLE 4

|  |  | Example 11 | Example 12 | Example 13 | Example 14 |
|---|---|---|---|---|---|
| Polylactic acid resin composition (part) | Crystalline LACEA H-100 | 20 | 20 | 30 | 50 |
|  | Non-Crystalline LACEA H-280 | 80 | 80 | 70 | 50 |
| Polyolefin wax | Kind | P-7 | P-8 | P-1 | P-1 |
|  | Amount (part) | 0.03 | 0.03 | 0.01 | 0.1 |
| Content of blowing agent of expandable particles (% by weight) |  | 6.2 | 5.8 | 5.4 | 5.2 |
| Bulk density of expanded beads (kg/m$^3$) |  | 49 | 38 | 45 | 38 |
| Average cell diameter of expanded beads (μm) |  | 330 | 570 | 60 | 50 |
| Average cell diameter of surface region of expanded beads (μm) |  | 430 | 760 | 120 | 80 |
| Inside pressure of expanded beads (MPa) |  | 0.10 | 0.17 | 0.13 | 0.10 |
| Appearance of foam molding |  | B | C | A | A |
| Apparent density of foam molding (kg/m$^3$) |  | 70 | 47 | 63 | 104 |
| Flexural strength of foam molding (MPa) |  | 0.58 | 0.35 | 0.73 | 1.8 |
| Flexural strength/apparent density ratio (kN · m/kg) |  | 8.3 | 7.4 | 11.6 | 17.3 |

TABLE 5

|  |  | Comparative Example 1 | Comparative Example 2 | Comparative Example 3 | Comparative Example 4 |
|---|---|---|---|---|---|
| Polylactic acid resin composition (part) | Crystalline LACEA H-100 | 20 | 20 | 20 | 20 |
|  | Non-Crystalline LACEA H-280 | 80 | 80 | 80 | 80 |
| Nucleating agent | Kind | — | talc | calcium stearate | ethylene-bisamide |
|  | Amount (part) | — | 0.1 | 0.1 | 0.1 |
| Content of blowing agent of expandable particles (% by weight) |  | 5.1 | 5.8 | 5.7 | 5.7 |
| Bulk density of expanded beads (kg/m$^3$) |  | 45 | 37 | 43 | 78 |
| Average cell diameter of expanded beads (μm) |  | 780 | 620 | 580 | 580 |
| Average cell diameter of surface region of expanded beads (μm) |  | 980 | 760 | 700 | 800 |
| Inside pressure of expanded beads (MPa) |  | 0.11 | 0.14 | 0.18 | 0.14 |
| Appearance of foam molding |  | D | C | C | D |
| Apparent density of foam molding (kg/m$^3$) |  | * | 46 | 60 | * |
| Flexural strength of foam molding (MPa) |  | * | 0.28 | 0.39 | * |
| Flexural strength/apparent density ratio (kN · m/kg) |  | * | 6.1 | 6.4 | * |

* Because of considerable shrinkage, neither the apparent density nor the flexural strength was evaluated In the above Tables 2 to 5, the appearance of the foam moldings was evaluated with naked eyes according to the following ratings.

A: Neither shrinkage nor deformation is observed. Surface is smooth.

B: Slight shrinkage is observed in corners. Surface is smooth.

C: Shrinkage is observed in corners and edges. Non-smooth surface is partly observed.

D: Significant shrinkage and deformation are observed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. Expanded polylactic acid resin beads comprising cell walls defining a plurality of cells, said cell walls comprising a base resin comprising a polylactic acid resin having at least 50 mol % of lactic acid monomer component units, and 0.0001 to 1 part of a polyethylene wax per 100 parts by weight of said base resin, said expanded beads having an average cell diameter of 10 to 500 μm; and
   wherein said polyethylene wax has a number average molecular weight of 1,700 to 4,000 and a molecular weight distribution index of 1.0 to 3.0.

2. The expanded beads as claimed in claim 1, wherein said expanded beads have a surface region having a thickness of 300 μm and an average cell diameter which is greater than the average cell diameter of said expanded beads.

3. The expanded beads as claimed in claim 2, wherein said surface region has an average cell diameter of 30 to 800 μm.

4. A foam molding obtainable by molding the expanded beads according to claim 1 in a mold.

5. The expanded beads as claimed in claim 1 having an average cell diameter of 20-300 μm.

6. The expanded beads as claimed in claim 2, wherein said surface region has an average cell diameter of 50 to 500 μm.

7. Expandable polylactic acid resin particles comprising:
   a base resin comprising a polylactic acid resin having at least 50 mol % of lactic acid monomer component units,
   a polyethylene wax in an amount of 0.0001 to 1 part by weight per 100 parts by weight of said base resin, said polyethylene wax having a number average molecular weight of 1.700 to 4,000 and a molecular weight distribution index of 1.0 to 3.0, and
   a blowing agent in an amount of 1 to 30% by weight based on the weight of said expandable polylactic acid resin particles.

8. The expandable polylactic acid resin particles as claimed in claim 7, wherein said polyolefin wax has a melting point of 80 to 125° C.

9. The expandable polylactic acid resin particles as claimed in claim 7, wherein said polyolefin wax has a degree of crystallization of at least 70%.

10. The expandable polylactic acid resin particles as claimed in claim 7 wherein the polylactic acid resin has a weight ratio of crystalline polylactic acid to non-crystalline polylactic acid of 10:90 to 70:30 and wherein crystalline polylactic acid resin is defined as having an endothermic calorific value of greater than 2 J/g, as measured by heat flux differential scanning calorimetry and crystalline polylactic acid is defined as having an endothermic calorific value of 2 J/g or less.

* * * * *